United States Patent
Yang et al.

(10) Patent No.: US 9,029,788 B2
(45) Date of Patent: *May 12, 2015

(54) FAST-NEUTRON DETECTOR

(71) Applicant: Nuctech Company Limited, Beijing (CN)

(72) Inventors: Yigang Yang, Beijing (CN); Qinjian Zhang, Beijing (CN); Yi Liu, Beijing (CN)

(73) Assignee: Nuctech Company Limited, Beijing (CN)

( * ) Notice: Subject to any disclaimer, the term of this patent is extended or adjusted under 35 U.S.C. 154(b) by 468 days.

This patent is subject to a terminal disclaimer.

(21) Appl. No.: 13/726,284

(22) Filed: Dec. 24, 2012

(65) Prior Publication Data

US 2013/0168560 A1    Jul. 4, 2013

(30) Foreign Application Priority Data

Dec. 28, 2011    (CN) .......................... 2011 1 0446162

(51) Int. Cl.
*G01T 1/20*    (2006.01)
*G01T 3/06*    (2006.01)

(52) U.S. Cl.
CPC ................. *G01T 3/06* (2013.01); *G01T 1/2018* (2013.01); *G01T 1/2006* (2013.01)

(58) Field of Classification Search
CPC ............................ G01T 1/2006; G01T 1/2018

USPC .......................................................... 250/366
See application file for complete search history.

(56) References Cited

U.S. PATENT DOCUMENTS

| | | | |
|---|---|---|---|
| 4,300,064 A | | 11/1981 | Eden |
| 4,795,910 A | * | 1/1989 | Henderson et al. ......... 250/483.1 |
| 5,231,290 A | | 7/1993 | Czirr |
| 5,636,299 A | * | 6/1997 | Bueno et al. .................... 385/15 |
| 7,333,701 B1 | * | 2/2008 | Feller et al. .................... 385/123 |
| 7,372,041 B1 | * | 5/2008 | Nagarkar et al. ......... 250/390.11 |
| 8,258,483 B1 | * | 9/2012 | Boatner et al. ........... 250/390.11 |
| 8,637,826 B2 | * | 1/2014 | Menge .......................... 250/368 |
| 2005/0023479 A1 | * | 2/2005 | Grodzins ................. 250/390.11 |
| 2011/0089332 A1 | * | 4/2011 | Ivan et al. ................ 250/390.11 |
| 2012/0292519 A1 | * | 11/2012 | Frank et al. .................... 250/367 |

OTHER PUBLICATIONS

Mailed Aug. 8, 2010 un-translated Chinese Office Action—Application No. 201110446162.4.

* cited by examiner

*Primary Examiner* — Christine Sung
(74) *Attorney, Agent, or Firm* — Casimir Jones S.C.

(57) ABSTRACT

The present invention provides a fast-neutron detector, comprising: a plastic scintillator array which includes at least one plastic scintillator unit, wherein sidewall surfaces of each plastic scintillator unit are covered or coated with a neutron-sensitive coating film. The fast-neutron detector based on such film-coated plastic scintillators according to the present invention advantageously addresses the mutual competition problem between a moderated volume and a measured volume in the prior art and can obtain a higher fast-neutron detecting efficiency.

9 Claims, 5 Drawing Sheets

FAST-NEUTRON DETECTOR

CROSS-REFERENCE TO RELATED APPLICATION

The present application claims priority to pending Chinese Patent Application No. CN201110446162.4, filed Dec. 28, 2011, the contents of which are incorporated by reference its entirety.

FIELD OF THE INVENTION

The present invention generally relates to application of nuclear technologies, and particularly to neutron scattering and security detection technologies. More particularly, the present invention relates to a fast-neutron detector.

BACKGROUND OF THE INVENTION

In traditional safety detection technologies for nuclear materials, it is a common technology to use $^3$He proportional counters and polyethylene moderators for fast-neutron detection. However, this technology at least has the following two drawbacks:

1. The supply of $^3$He gas is insufficient. Since $^3$He is an important nuclide for detecting neutron, the insufficient supply problem of $^3$He which has been occurring commonly throughout the world has already imposed a serious challenge to application of nuclear material security detection technologies so that manufacturing costs of security apparatuses rise abruptly.

2. In this technology, the moderated volume and the measured volume of neutrons are independent on each other, i.e., the moderated volume is constituted by polyethylene whereas the measured volume is constituted by $^3$He proportional counter. The moderated volume is in a competitive relation to the measured volume in space, and a final detection efficiency depends on a product of a fast-neutron moderating efficiency and a thermal neutron absorbing efficiency to which the moderated volume and the measured volume correspond respectively, whereby the moderated volume cannot be made too large, nor the measured volume can be made too large, which limits the maximum fast-neutron detection efficiency achieved by this technology.

SUMMARY OF THE INVENTION

An object of the present invention is to provide a novel technical solution for fast-neutron detection without using the nuclide $^3$He in short supply, so as to reduce manufacturing costs and better meet the increasing market demand for security check apparatuses.

A further object of the present invention is to enable the implementation of the fast-neutron maximum detecting efficiency in the technical solution of the present invention to be free of inter-restraint factors, so as to obviate the competitive relationship between the moderated volume and the measured volume in the prior art, and obtain a greater fast-neutron detecting efficiency.

Generally speaking, the present invention inventively employs the following basic ideas to achieve the above objects of the present invention, so as to obtain a high fast-neutron detecting efficiency while advantageously reducing the manufacturing costs of the fast-neutron detector:

1. Using plastic scintillators to achieve neutron moderating and signal forming function required by the fast-neutron detector;

2. Carrying out neutron-sensitive coating film treatment on the surface of the plastic scintillators to achieve the neutron absorbing function required by the fast-neutron detector.

In particular, the present invention provides a fast-neutron detector, comprising: a plastic scintillator array which includes at least one plastic scintillator unit, wherein sidewall surfaces of each plastic scintillator unit are covered or coated with a neutron-sensitive coating film.

Preferably, the plastic scintillator array has a first end for receiving incident fast-neutrons and a second end opposite to the first end. And preferably, the fast-neutron detector further comprises: a light guide device disposed at the second end of the plastic scintillator array and configured to collect and guide light formed in the plastic scintillator unit and being emergent to the second end; and a photoelectrical converting device disposed at an emergent end of the light guide device and configured to convert the light collected and guided by the light guide device thereon into electrical signals.

Preferably, the at least one plastic scintillator unit comprises a plurality of plastic scintillator units.

Preferably, the neutron-sensitive coating film is formed by directly coating a film on the sidewall surfaces of each plastic scintillator unit.

Preferably, the neutron-sensitive coating film is first formed by film coating on a substrate, then the sidewall surfaces of the plastic scintillator unit are covered (or wrapped) with the substrate after film coating in a way that the neutron-sensitive coating film is in contact with the sidewall surfaces of the plastic scintillator unit.

Preferably, a material for forming the neutron-sensitive coating film contains boron or gadolinium.

Preferably, the thickness of the neutron-sensitive coating film is in a range of 0.1 μm-4 μm.

Preferably, the height of each plastic scintillator unit is 10 cm-50 cm, and the length and the width thereof are 0.1 cm-5 cm.

Preferably, a cross section of each plastic scintillator unit is a regular polygon, preferably a square or a regular hexagon.

Preferably, the fast-neutron detector according to the present invention may further comprise: an amplifying shaping circuit configured to receive the electrical signal outputted from the photoelectrical converting device and amplify and shape it; a signal picking circuit configured to receive the electrical signal outputted by the amplifying shaping circuit and extract a time signal therefrom; a delay circuit configured to receive the time signal outputted by the signal picking circuit and delay it; a coincidence circuit at least having a first input channel and a second input channel, wherein the first input channel receives a non-delay time signal outputted by the signal picking circuit, and the second input channel receives a delay time signal outputted by the delay circuit, and the coincidence circuit generates a coincidence pulse signal according to the non-delay time signal and the delay time signal; and a counter configured to receive the coincidence pulse signals outputted by the coincidence circuit and count them to finally obtain a coincidence count.

In the novel fast-neutron detector based on such film-coated plastic scintillators according to the present invention, it can be approximately believed that the moderated volume is identical with the measured volume. Therefore, the present invention advantageously addresses the mutual competition and counterbalance problem of the two types of volumes in the prior art and can obtain a higher fast-neutron detecting efficiency.

From the following detailed description of preferred embodiments of the present invention with reference to the drawings, those skilled in the art can better understand the above and other objects, advantages and features of the present invention.

BRIEF DESCRIPTION OF DRAWINGS

Preferred embodiments of the present invention will be described in detail hereafter with reference to the drawings by way of example, but not limitation. Like reference numbers throughout the drawings refer to the like or similar parts or portions. Those skilled in the art should appreciate that these drawings are not necessarily drawn to scale. In the drawings.

DETAILED DESCRIPTION OF PREFERRED EMBODIMENTS

Figure 1:
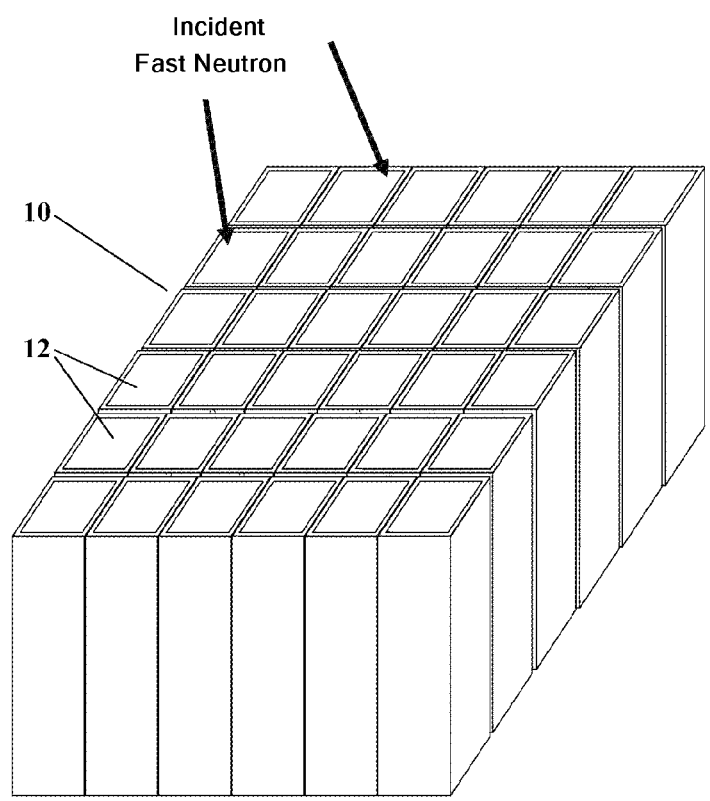
FIG. 1 is a schematic perspective view of a plastic scintillator array used in a fast-neutron detector according to a preferred embodiment of the present invention.

A fast-neutron detector according to the present invention employs a plastic scintillator array 10 shown in FIG. 1 to achieve neutron moderating and optical signal forming functions. The plastic scintillator array 10 has a first end for receiving incident fast-neutrons and a second end opposite to the first end. When the fast-neutrons are incident into the scintillator array 10 from the first end, moderating, absorbing, ionizing and light-emitting procedures will happen therein so as to achieve measurement of fast-neutrons.

The plastic scintillator array 10 may be comprised of at least one (preferably a plurality of) identical plastic scintillator unit(s) 12, and its overall configuration (defined by an outer envelope line of the array) may be in any suitable shape such as a squire, rectangle, circle or hexagon. In the preferred embodiment shown in FIG. 1, the plastic scintillator array 10 is constructed as a m×m square array, wherein m represents the number of plastic scintillator units included by a side length of the array. Therefore, m is generally a positive integer greater than or equal to 2, preferably equal to 6 or 10 or more, more preferably equal to 12, 15, 20, 25, 30 or more. Nevertheless, in an extreme case, m may be equal to 1, that is, in the extreme case, the plastic scintillator array stated in the present application may be comprised of only one plastic scintillator unit 12.

Figure 2:
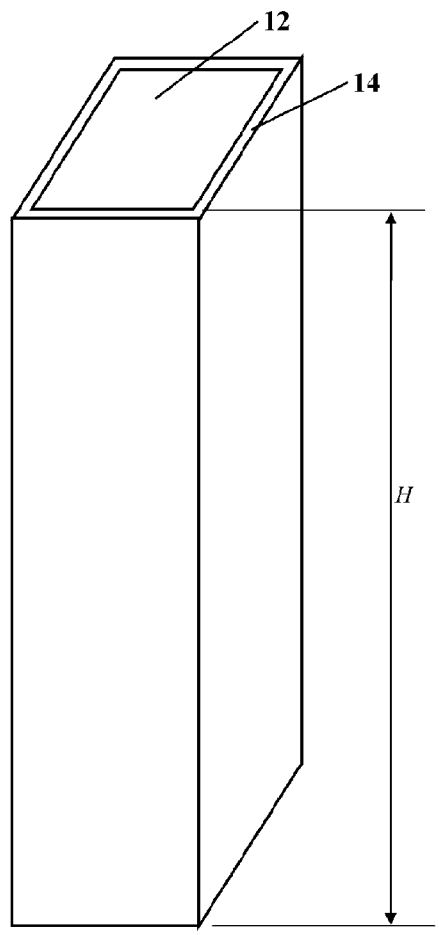
FIG. 2 is a schematic enlarged perspective view of a plastic scintillator unit used in the plastic scintillator array shown in FIG. 1.
Figure 3:
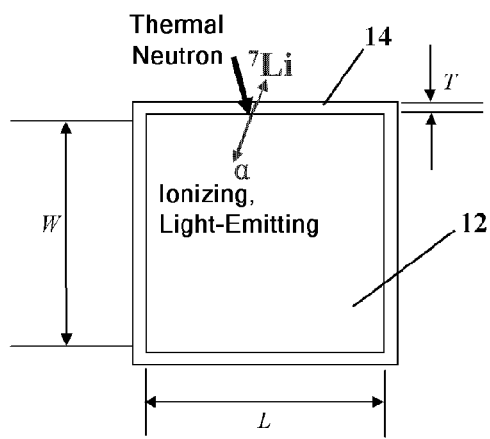
FIG. 3 is a schematic cross-sectional view of the plastic scintillator unit shown in FIG. 2.

A cross section of each plastic scintillator unit 12 may preferably be one of various regular polygons, preferably a square or a regular hexagon. FIG. 2 is a schematic enlarged perspective view of the plastic scintillator unit 12 used in the plastic scintillator array 10 shown in FIG. 1, and FIG. 3 is a schematic cross-sectional view of the plastic scintillator unit shown in FIG. 2, wherein the plastic scintillator unit 12 has a height H, a length L and a width W. IN some embodiments of the present invention, the height H of the plastic scintillator unit may be about 10 cm-50 cm, and the length L and width W may be about 0.1 cm-5 cm respectively. Particularly, in the preferred embodiment shown in FIGS. 2-3, the height H of the plastic scintillator unit is preferably about 20 cm; the length L and the width W are preferably equal to each other, equal to about 1 cm. Of course, the height H, the length L and the width W may be optimally adjusted as particularly desired.

The sidewall surfaces of each plastic scintillator unit 12 are covered or coated with a layer of neutron-sensitive coating film 14 with a thickness T. The material for forming the neutron-sensitive coating film preferably contains boron or gadolinium. In some embodiments of the present invention, the thickness T may be in a range of about 0.1 μm-about 4 μm, preferably about 1 μm. Of course, a specific magnitude of the thickness T here may be appropriately adjusted as desired.

In some preferred embodiment of the present invention, the neutron sensitive coating film 14 may be directly formed on the sidewall surfaces of each plastic scintillator unit 12, as shown in FIG. 2. Those skilled in the art may appreciate that the method requires that a temperature for the film coating process is lower than a softening temperature of the plastic scintillator unit 12.

Figure 4:
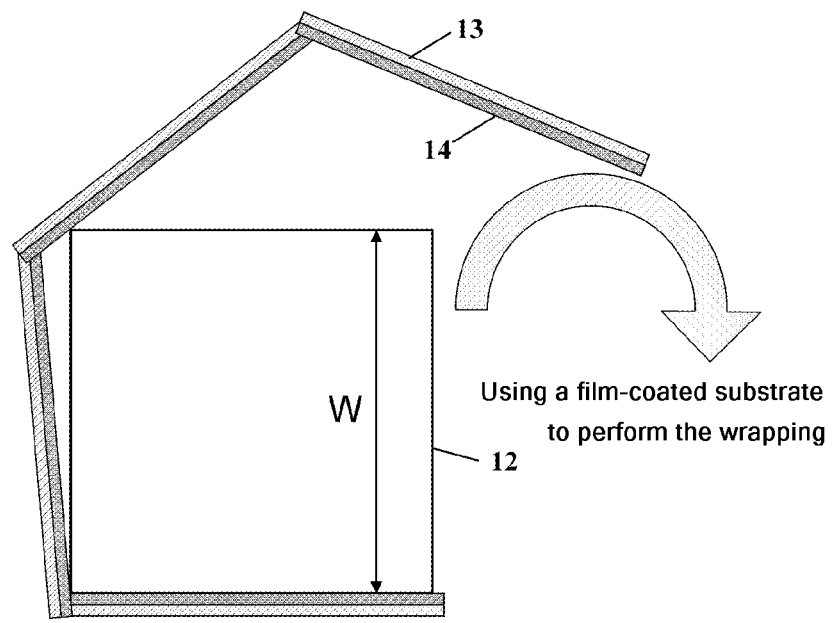
FIG. 4 is a schematic view of wrapping the sides of the plastic scintillator unit in a film-coated substrate according to another preferred embodiment of the present invention.
Figure 5:
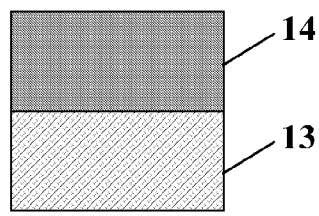
FIG. 5 is a schematic cross-sectional view of the film-coated substrate shown in FIG. 4.

In some other preferred embodiments of the present invention, as shown in FIGS. 4-5, the neutron-sensitive coating film 14 can be first formed on the substrate 13 by film coating, then the sidewall surfaces of the plastic scintillator unit 12 are covered by the substrate 13 with the neutron-sensitive coating film 14 in a way that the neutron-sensitive coating film 14 is in contact with the sidewall surfaces of the plastic scintillator unit 12, so that the plastic scintillator unit has a neutron-sensitive property. In such an embodiment, the substrate 13 is preferably made of aluminum foil or other suitable materials.

No matter whether the plastic scintillator unit 12 is directly film-coated or the substrate 13 is film-coated, the film-coating process may be one of various suitable manners such as magnetron sputtering, electron beam evaporation, electrophoresis or atomic layer deposition.

Figure 6:
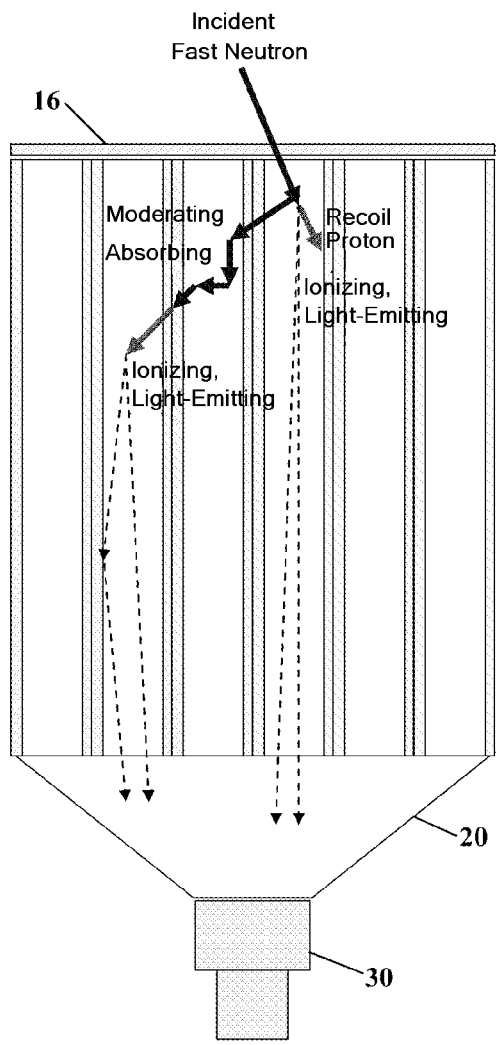
FIG. 6 is a schematic structural view of the fast-neutron detector according to a preferred embodiment of the present invention, showing a moderation procedure and an absorbing procedure as well as ionizing and light-emitting procedure which happen after the fast-neutrons are incident into the plastic scintillator array.

The moderating procedure and the absorbing procedure shown in FIG. 6 will occur after the neutrons are incident into the plastic scintillator array 10. Both the moderating procedure and the absorbing procedure produce high-energy charged particles, wherein what are obtained in the moderating procedure are recoil protons which energy is approximately equal to that of the incident neutrons. What are obtained in the absorbing procedure are charged particles after nuclear reaction. If $^{10}B$ is selected as the neutron reaction nuclide, the reaction formula is as follows:

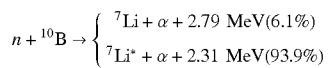

$$n + {}^{10}B \rightarrow \begin{cases} {}^{7}Li + \alpha + 2.79 \text{ MeV}(6.1\%) \\ {}^{7}Li^* + \alpha + 2.31 \text{ MeV}(93.9\%) \end{cases}$$

The charged particles obtained from the above reaction formula are α particles and $^7Li$ nucleus. These charged particles (protons p, α, $^7Li$) occurs ionizing light emission in the scintillators, and the emitted light spreads along each plastic scintillator unit. It should be noted here that, before entering each plastic scintillator unit 12, α and $^7$Li first penetrate a neutron absorbing material with unequal thicknesses (depending on reaction position). Since energy loses during the penetration, an magnitude of the signal formed in each plastic scintillator unit 12 is reduced. Therefore, the thickness of the neutron absorbing material is preferably not too large, and 1 μm or so may be usually a desirable value.

Preferably, the second end of the plastic scintillator array 10 is provided with a light guide device 20 configured to collect and guide light formed in the respective plastic scintillator units 12 and being emergent to the second end of the plastic scintillator array 10. At an emergent end of the light guide device 20 is provided a photoelectrical converting device 30 configured to convert the light collected and guided by the light guide device 20 thereon as electrical signals.

The photoelectrical converting device 30 is preferably a photoelectrical multiplier tube. However, in some embodiments, other photoelectrical converting devices such as a photodiode are also possible.

In addition, in some other embodiments of the present invention, at the first end of the plastic scintillator array 10 may also be provided identical or similar light guide device and/or photoelectrical converting device to collect and detect light which might be emergent from the first end of the plastic scintillator array 10 to further improve the detecting efficiency.

As shown in FIG. 6, when the light guide device 20 and the photoelectrical converting device 30 are provided only at the second end of the plastic scintillator array 10, a layer of reflection material (e.g., aluminum foil, or polytetrafluoroethylene) may be preferably added to the first end of the plastic scintillator array 10 so as to increase the number of photons collected by the light guide device 20 and the photoelectrical converting device 30 at the second end.

In order not to obscure the technical solution of the present application, some common circuits usually needed after the photoelectric converting device 30 (e.g., an analog/digital converting circuit that may be needed in the subsequent processing) will not be described in detail or will be omitted hereafter, because these ordinary processing circuits are well-known and readily implemented for those skilled in the art.

Table 1 exemplarily lists intrinsic detecting efficiencies of 1 MeV neutrons obtained by analog computation where changing the dimensions of the plastic scintillators and the thickness of the neutron-sensitive coating film coated with boron, so that those skilled in the art can better implement the present invention with reference to these data in various specific applications.

TABLE 1

| Height H (cm) | Width/Length W/L (cm) | Boron thickness (μm) | 1 MeV neutron detecting efficiency (%) |
|---|---|---|---|
| 10 | 0.5 | 0.5 | 14.4 |
| 10 | 0.5 | 1 | 17.3 |
| 10 | 0.5 | 2 | 15.9 |
| 10 | 1 | 0.5 | 10.2 |
| 10 | 1 | 1 | 13.6 |
| 10 | 1 | 2 | 13.7 |
| 20 | 0.5 | 0.5 | 40.0 |
| 20 | 0.5 | 1 | 41.6 |
| 20 | 0.5 | 2 | 34.1 |
| 20 | 1 | 0.5 | 31.6 |
| 20 | 1 | 1 | 36.6 |
| 20 | 1 | 2 | 32.0 |
| 50 | 0.5 | 0.5 | 47.4 |
| 50 | 0.5 | 1 | 47.3 |
| 50 | 0.5 | 2 | 37.8 |
| 50 | 1 | 0.5 | 38.9 |
| 50 | 1 | 1 | 42.9 |
| 50 | 1 | 2 | 36.0 |

Since the detector of the present invention is implemented based on the plastic scintillators which are per se sensitive to the X/γ, the detector of the present invention cannot prevent from sensitivity to X/γ measurement, which is disadvantageous for improvement of the n/γ ratio. In order to eliminate the above disadvantageous effect and increase the n/γ ratio, in some further preferred embodiments of the present invention, a time coincidence method is particularly employed to select neutron events on the basis principle that each captured neutron necessarily experiences complete loss of incident kinetic energy (the main objects for the loss are recoil protons); after a period of time after production of the recoil protons, the neutrons will be captured and form charged particles; the time distribution of the two groups of charged particles is in a certain relationship, and the relationship may be extracted by a coincidence circuit so that the n/γ ratio may be increased.

Figure 7:
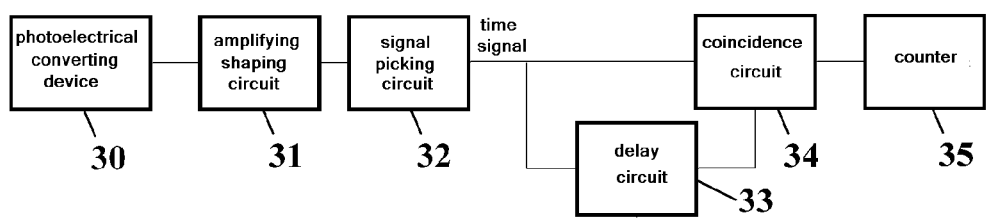
FIG. 7 is a schematic block diagram of a processing circuit for processing electrical signals outputted by a photoelectrical converting device to improve n/γ ratio based on a time coincidence method.

FIG. 7 is a schematic block diagram of a processing circuit for processing electrical signals outputted by a photoelectrical converting device to increase the n/γ ratio based on a time coincidence method. As shown in this figure, the photoelectrical converting device 30 converts the light collected and guided thereon into an electrical signal, then an amplifying shaping circuit 31 receives the electrical signal outputted from the photoelectrical converting device 30 and amplifies and shapes it; a signal picking circuit 32 receives the electrical signal outputted by the amplifying shaping circuit 31 and extracts a time signal therefrom (for example, by means of threshold judgment and selection or other time extracting methods known in the art); a delay circuit 33 receives the time signal outputted by the signal picking circuit 32 and delays it; a coincidence circuit 34 receives a non-delay time signal outputted by the signal picking circuit 32 at its first input channel, receives the delay time signal outputted by the delay circuit 33 at its second input channel, and generates a coincidence pulse signal according to the non-delay time signal and the delay time signal; a counter 35 receives the coincidence pulse signals outputted by the coincidence circuit 34 and counts them to finally obtains a coincidence count.

Figure 8:
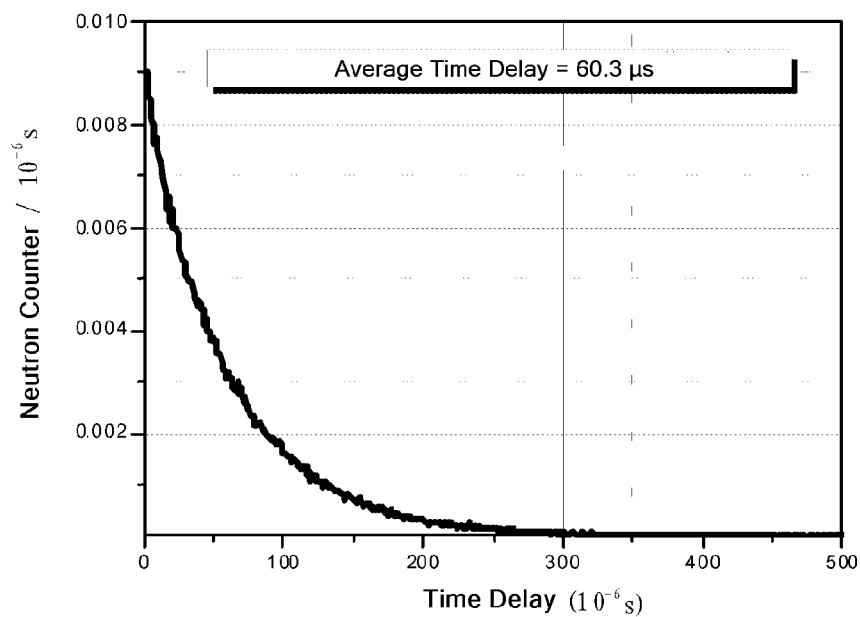
FIG. 8 is an exemplary curve graph showing time distribution relationship between a neutron recoil proton signal and a neutron capture signal.

FIG. 8 exemplarily illustrates a time distribution relationship between a neutron recoil proton signal and a neutron capture signal. It can be seen from this figure that an average time delay is about 60 microseconds. As can be seen, when a time window of the coincidence circuit shown in FIG. 7 is set to be about 200 microseconds, a higher true coincidence count rate can be ensured. Of course, the coincidence time of 200 microseconds might also increase the count rate of accidental counting. A user can select a suitable time window in specific applications according to actual situations.

So far, those skilled in the art can appreciate that although exemplary preferred embodiments have been illustrated and described in detail, many other variations or modifications conforming to the principles of the present invention can be directly determined or derived from the disclosure of the present application without departing from the spirit and scope of the present invention. Therefore, the scope of the present invention shall be understood and recognized as covering all of these other variations or modifications.

What is claimed is:

1. A fast-neutron detector comprising:
a plastic scintillator array which includes at least one plastic scintillator unit, wherein sidewall surfaces of each plastic scintillator unit are covered or coated with a neutron-sensitive coating film, wherein the plastic scintillator array has a first end for receiving incident fast neutrons and a second end opposite to the first end; and the fast-neutron detector further comprises: a light guide device disposed at the second end of the plastic scintillator array and configured to collect and guide light formed in the plastic scintillator unit and being emergent to the second end; and a photoelectrical converting device disposed at an emergent end of the light guide device and configured to convert the light collected and guided by the light guide device thereon into electrical signals,
further comprising: an amplifying shaping circuit configured to receive the electrical signal outputted from the photoelectrical converting device and amplify and shape it; a signal picking circuit configured to receive the electrical signal outputted by the amplifying shaping circuit and extract a time signal therefrom a delay circuit configured to receive the time signal outputted by the signal picking circuit and delay it; a coincidence circuit at least having a first input channel and a second input channel, wherein the first input channel receives a non-delay time signal outputted by the signal picking circuit, the second input channel receives a delay time signal outputted by the delay circuit, and the coincidence circuit generates a coincidence pulse signal according to the non-delay time signal and the delay time signal; and a counter configured to receive the coincidence pulse signals outputted by the coincidence circuit and count them to obtain a coincidence count.

2. The fast-neutron detector according to claim 1, wherein the least one plastic scintillator unit comprises a plurality of plastic scintillator units.

3. The fast-neutron detector according to claim 1, wherein the neutron-sensitive coating film is directly formed by coating a film on the sidewall surfaces of each plastic scintillator unit.

4. The fast-neutron detector according to claim 1, wherein the neutron-sensitive coating film is first formed by film coating on a substrate, then the sidewall surfaces of the plastic scintillator unit are covered with the substrate after film coating in a way that the neutron-sensitive coating film is in contact with the sidewall surfaces of the plastic scintillator unit.

5. The fast-neutron detector according to claim 1, wherein a material for forming the neutron-sensitive coating film contains boron or gadolinium.

6. The fast-neutron detector according to claim 1, wherein the thickness of the neutron-sensitive coating film is in a range of 0.1 μm-4 μm.

7. The fast-neutron detector according to claim 1, wherein the height of each plastic scintillator unit is 10 cm-50 cm, and the length and the width thereof are 0.1 cm-5 cm.

8. The fast-neutron detector according to claim 7, wherein a cross section of each plastic scintillator unit is a square or a regular hexagon.

9. The fast-neutron detector according to claim 1, wherein a cross section of each plastic scintillator unit is a regular polygon.

* * * * *

UNITED STATES PATENT AND TRADEMARK OFFICE
CERTIFICATE OF CORRECTION

| | | |
|---|---|---|
| PATENT NO. | : 9,029,788 B2 | Page 1 of 1 |
| APPLICATION NO. | : 13/726284 | |
| DATED | : May 12, 2015 | |
| INVENTOR(S) | : Yang et al. | |

It is certified that error appears in the above-identified patent and that said Letters Patent is hereby corrected as shown below:

In the Claims

Column 7, line 25, claim 1 should read:

and extract a time signal therefrom; a delay circuit configured

Signed and Sealed this
Twenty-second Day of September, 2015

Michelle K. Lee
*Director of the United States Patent and Trademark Office*